(12) United States Patent
Agrawala et al.

(10) Patent No.: US 8,219,670 B2
(45) Date of Patent: Jul. 10, 2012

(54) SYSTEM AND METHOD FOR ADAPTIVE CONTEXT AWARE INTERACTION OF USER WITH ENTITY OF INTEREST

(75) Inventors: Ashok K. Agrawala, Ashton, MD (US); Amitabh Varshney, Ellicott City, MD (US); Christian B. Almazan, Greenbelt, MD (US)

(73) Assignee: University of Maryland, College Park, MD (US)

( * ) Notice: Subject to any disclaimer, the term of this patent is extended or adjusted under 35 U.S.C. 154(b) by 0 days.

(21) Appl. No.: 12/267,921

(22) Filed: Nov. 10, 2008

(65) Prior Publication Data

US 2009/0125584 A1  May 14, 2009

Related U.S. Application Data

(60) Provisional application No. 60/986,361, filed on Nov. 8, 2007, provisional application No. 60/986,358, filed on Nov. 8, 2007.

(51) Int. Cl.
*G06F 15/173* (2006.01)
*G06F 15/16* (2006.01)

(52) U.S. Cl. ....................... 709/224; 709/219
(58) Field of Classification Search .................. None
See application file for complete search history.

(56) References Cited

U.S. PATENT DOCUMENTS

| | | | |
|---|---|---|---|
| 6,028,514 A * | 2/2000 | Lemelson et al. | 340/539.13 |
| 7,363,001 B2 * | 4/2008 | Steelberg et al. | 455/3.06 |
| 7,706,740 B2 * | 4/2010 | Collins et al. | 455/3.01 |
| 2004/0015379 A1 * | 1/2004 | Mee | 705/7 |
| 2004/0024851 A1 * | 2/2004 | Naidoo et al. | 709/219 |
| 2005/0134455 A1 * | 6/2005 | Binning | 340/539.18 |
| 2007/0185989 A1 * | 8/2007 | Corbett et al. | 709/224 |
| 2007/0232275 A1 * | 10/2007 | Collins et al. | 455/413 |
| 2007/0273499 A1 * | 11/2007 | Chlubek et al. | 340/521 |
| 2009/0240590 A1 * | 9/2009 | Or et al. | 705/14.58 |

OTHER PUBLICATIONS

Banerjee, S., et al.; "Rover Technology: Enabling Scalable Location-Aware Computing", MIND Lab, UMIACS-TR 2001 and CS-TR4312, Dec. 2001, pp. 1-14.
Banerjee, S., et al.; "Rover: Scalable Location-Aware Computing", Computer, Oct. 2002, pp. 56-63.

* cited by examiner

*Primary Examiner* — John B. Walsh
(74) *Attorney, Agent, or Firm* — Rosenberg, Klein & Lee

(57) ABSTRACT

A multifunctional interaction system which is capable of spatio-temporal context localization of users and of communication of audio/video streams to an entity of interest defined by the user, includes a communication domain supporting a predefined localization service, a server associated with the communication domain, client devices, and a dynamically changing context database which is customized in accord with the dynamics of interaction sessions of client devices with the server. The client communicates with the system to either request services therefrom or to send a message to the entity of interest. The system is provided with a panic alert mechanism which, upon actuation, transmits an audio/video data stream along with the client location tag, time stamp, and client ID, to a police precinct for prompt action.

19 Claims, 10 Drawing Sheets

SYSTEM AND METHOD FOR ADAPTIVE CONTEXT AWARE INTERACTION OF USER WITH ENTITY OF INTEREST

REFERENCE TO RELATED APPLICATIONS

The present Utility Patent Application is based on Provisional Patent Applications No. 60/986,361 and No. 60/986,358, both filed on 8 Nov. 2007.

FIELD OF THE INVENTION

The present invention relates to a system for interaction between users and an entity of interest for receiving services therefrom, and more in particular, to an interaction system capable of providing spatio-temporal-context aware services to the users.

Even more in particular, the present invention is directed to a situational awareness, authentication and querying system having an ability to effectively communicate the desired audio/video streams between individuals and chosen entities of interest.

The present invention also is directed to an interaction system equipped with a panic alert mechanism in which audio/video streams acquired or delivered on cell phones, along with their location tags and time stamps, are forwarded to a server and further to an emergency response unit, such as for example a police department and/or a police dispatcher for adequately responding to a situation and subsequent developments, with the possibility of dispatching a patrol car to the location of the incident.

The present invention is further directed to an interactive system where a user initiates a variety of queries to request services which are either supported by the system, or are requested by the system from a variety of external service providers.

Further, the present invention is directed to a flexible interaction system where the users define the entity of interest in accordance with their preferences. The entity of interest may include logical groups, social networks, or may be categorized by geographic locations, situational determinations, context-sensitive locations, or based on a temporal specification.

The present system is further directed to the interaction system in which a user is provided with the services designated to substantially improve the quality of the user's life, and where the system dynamically reacts to the spatio-temporal-context based characteristics of the interaction session between the users and the system.

BACKGROUND OF THE INVENTION

Location-aware computing involves the automatic tailoring of information and services based on the current location of the users. A scalable location aware computing system that enables location-based services, as well as the traditional time-aware, user-aware and device-aware services is described in S. Banerjee, et al., "Rover Technology: Enabling Scalable Location-Aware Computing", MIND Lab, UMI-ACS-TR 2001 and CS-TR4312, December 2001, pp. 1-14, and S. Banerjee, et al., "Rover: Scalable Location-Aware Computing", published in "Computer" October 2002, pp. 56-63. The architecture, as presented in the publications, includes the following entities:

End-users—the system maintains a user profile for each end user that defines specific interests of the user and is used to customize the content served;

Client devices through which users interact with the system. The system maintains a device profile for each device, identifying its capabilities and the functionality available at the device;

A wireless access infrastructure which provides wireless connectivity to the clients. Possible wireless access technologies include IEEE802.11 based wireless LANs, Bluetooth and cellular services;

A server system which implements and manages the various services provided to the end users. The servers include the following components:

a controller which provides and manages different services requested by a client. The controller schedules and filters content sent to the clients based on the user and device profiles and their current locations, a location server which is a dedicated unit responsible for managing the client device location services within the system, a media streaming unit which provides the streaming of audio and video content to the clients, a database which stores all content delivered to the clients. The database also serves as a stable store for the state of the users and clients that is maintained by the controller, and a logger which interacts with all the server components and receives the log messages from their instrumentation modules.

The database in the system consists of two components including the user info base which maintains user and device information of all active users and devices in the system. It also contains all client specific context of the users and devices, namely profiles and preferences, client location, and triggers defined by the clients. This information changes at a fairly regular rate as a function of client activities, e.g., the client location alters with movements. Another component in the database is the content info base which stores the content that is served by the controller and changes in a less frequent manner. The content provider of the system is responsible for keeping this info base updated.

Although being capable of automatically tailoring information services based on the current location of the user, the described prior art system is somewhat limited in its functionality and is not adaptable to providing the users the capability to send audio/video data streams to entities of interest which may be defined by the user. This includes, for example, logical groups, e.g. multiple users combined by predetermined characteristics, clients and outsiders alike, entities of interest based on their geographic, temporal or functional characteristics, etc. Further, the prior system, as described, does not have a panic alert mechanism for receiving services and/or help from emergency response units, such as police departments or other emergency type units. Additionally, in the prior art system, although the computation is context based, the context only relates to users themselves and does not mitigate other related services. Further, the discussed system does not include an interface which permits authorized data to be seen by an outsider.

Therefore, it would be highly desirable to provide a spatio-temporal-context aware interactive system free of the above-discussed deficiencies of the prior art system, and which would permit a broad range of functionality, such as a panic alert mechanism, recording the audio/video data streams from the client devices on the system's server to be further distributed to an entity defined by the user, and capable of in-real-time dynamical customization of the context structure in response to the dynamics of an interaction session, as well as having the capability of abstracting context related to multiple users and groups.

SUMMARY OF THE INVENTION

It is therefore an object of the present invention to provide a widely available situational awareness and querying system capable of spatio-temporal context localization of users with the ability to actively communicate desired audio/video data streams from the user to their chosen entities of interest, including emergency response units, for further actions associated with a particular situation.

It is another object of the present invention to provide an interactive system permitting users to visually query the data-streams from the system based on their context in space, time, or relationship networks.

It is a further object of the present invention to provide an interactive system in which context information is customized in real-time and where the services are provided by the system in accordance with the dynamics of the interaction session.

It is also an object of the present invention to provide a panic alert system, for alerting public safety personnel when a user encounters an emergency situation requiring assistance, by activating the panic alert mechanism and forwarding audio and video data streams to the system's server along with user identification, location of the user, and time stamp. The public safety unit has the capability of communicating with the client using various communications means including SMS, audio and video, and is able to access the information in the system's server related to the incident and/or the user him/herself. The public safety personnel, based on the information received from the place of incident, may make a decision on further development of the situation and take corresponding actions.

Another aspect of the present invention is to provide a system for spatio-temporal-context aware interaction of users with an entity of interest. The system includes one or more communication domains, each covering a respective area of interest, and at least one server operatively coupled with each communication domain.

A plurality of client devices associated with respective users are connected with the server in the respective communication domain for interaction sessions initiated either for receiving services (information) or for distributing information in any form to an entity of interest defined by the user client.

The information communicated between the client device and the server may be in the form of a text message from the client device, a query from the client device for a service, audio stream, video stream, audio/video stream, as well as stationary pictures.

The entity of interest is defined by a user and may include a target audience for distribution of the information, logical groups, social networks, professional networks, target location and a temporal extent for distribution of the information. It also may be a client device, a user, an outsider of the system, as well as the server of another communication domain, a server provider, information bank, website(s), etc.

The system further has a context database which is customized in real-time in accordance with the dynamics of the interaction session of the client device with the server. In the present system, the information communicated between the client device and the server is accessible by an authorized entity of interest in a controlled manner.

The context database may include a broad range of data concerning users specific information, clients specific information, temporal characteristics of the interaction session, communication channel characteristics, location of the client devices, goals of the interaction session, privacy policy, security policy, networking information, data concerning events and services of interest, specific information on the communication domain, etc.

The system includes a panic alert mechanism allowing transmission of audio/video data streams along with contextual information (including the user ID, location, and time) to the server from the site of incident. This information is further transferred to public safety units such as police departments, emergency, or other entities of interest.

The server in the communication domain operates for spatio-temporal-context localization of the client device and dynamically collects contextual information, customizes the interaction session based on the contextual information, and controls provision of the services in the context of the current interaction session.

The system of the present invention contemplates communication between different communication domains through a communication channel with predetermined and customizable characteristics. When a user moves from one communication domain to another, the system provides seamless transition for localization determination.

A device customization unit is operatively coupled to the server and operates to dynamically optimize communication between the client device and the server based on the contextual information contained in the context database.

The present invention includes a panic alert system based on spatio-temporal-context aware communication of users with an emergency responsive unit, in which each client device is given a panic alert indicia for being actuated by the user in a particular situation requiring help. This action results in forwarding of an audio/video data stream to the server for recordation in the server's information bank. The server further forwards the audio and video data streams, along with the contextual information (client device identification, location of the user, and time of incident) to the police department or other outside aid facilities for further action.

The present invention also covers a method for interaction of users with an entity of interest, where a plurality of client devices are coupled to a server associated with the communication domain and wherein, upon actuating the interaction session, the client device sends a data stream to the server for being forwarded to an entity of interest along with spatio-temporal-contextual information concerning the respective user, client, client device and the interaction session. The entity of interest may include, but is not limited to, a police department, emergency unit, logical group, social network, etc.

These and other features and advantages of the present system and method will be fully understood in view of the further detailed description of the preferred embodiments and accompanying Patent Drawings.

DESCRIPTION OF THE PREFERRED EMBODIMENTS

Figure 1:
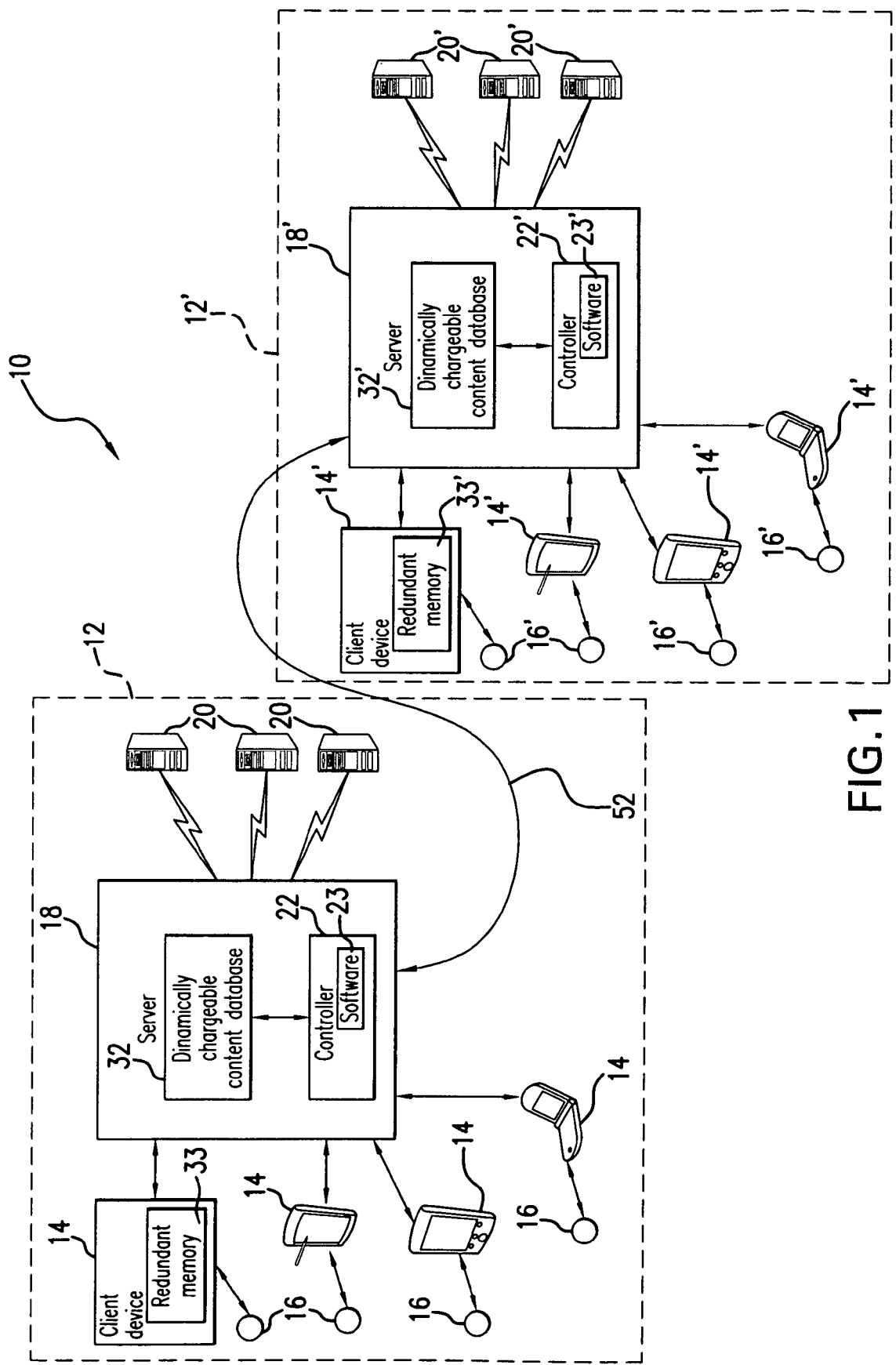
FIG. 1 is a schematic representation of the system of the present invention.

Referring to FIG. 1, the interaction system 10, also referred to herein as MyeVyu system, is implemented for providing a variety of context-aware and time-aware services to a plurality of clients. The MyeVyu system includes the components, referred to herein as system entities, which comprise one or several communication domains 12, . . . , 12', a plurality of clients devices 14 through which users 16 communicate with a server 18, and a plurality of service providers 20. All entities communicate each with the other as will be further described in following paragraphs.

Each communication domain 12, . . . 12', is usually a contiguous or functional area which supports communication services so that all entities in the communication domain may communicate directly. The communication domain for providing wireless connectivity between the system components may include wireless services using available communication facilities which are deployed in areas of interest and which may be implemented using any communication technologies including: WiMAX, WiFi, Bluetooth, wireless LANs, cellular services, Ethernet services, etc.

A plurality of users 16 use their respective client devices 14 for interaction with the MyeVyu system 10. Client devices 14 are the devices through which users communicate with the system 10 to access the services provided by the system and/or to communicate data thereto for further distribution to an intended entity. The client devices are contemplated as small wireless handheld units with a diverse set of capabilities in regard to processing, memory and storage, graphics and display, and network interface. The client devices may be cellular phones, PDAs, tablets, laptops, desktops, etc. The system maintains a profile for each client device, identifying its capabilities, and thus, the functionality available at the client device.

Each client device may have computation and storage capabilities. Each client device has I/O ability provided by its display, such as for example touch sensitive displays, microphones, web cameras, speakers/earphones, pointing devices, etc. The system maintains a user profile for each user that defines specific interests of the user and is used to customize the content (information) served by the system responsive to the user's query for specific services.

Associated with each communication domain 12, . . . , 12', is at least one server system 18, . . . , 18' which is responsible for managing all communications, maintaining context for interaction sessions, and arranging all services to the users 16. In FIG. 1, the entities associated with the communication domain 12', are designated by primed element numbers of similar entities associated with the communication domain 12. The server 18 provides structured information storage to the clients, which may be accessed by other clients in a completely controlled manner.

The server system 18 includes a controller 22 which provides and manages different services requested by the client devices as instructed by software 23 underlying the operation of the MyeVyu system 10. It also schedules and filters the content sent to the clients based on the user and device profiles as well as their current locations.

Figure 2:
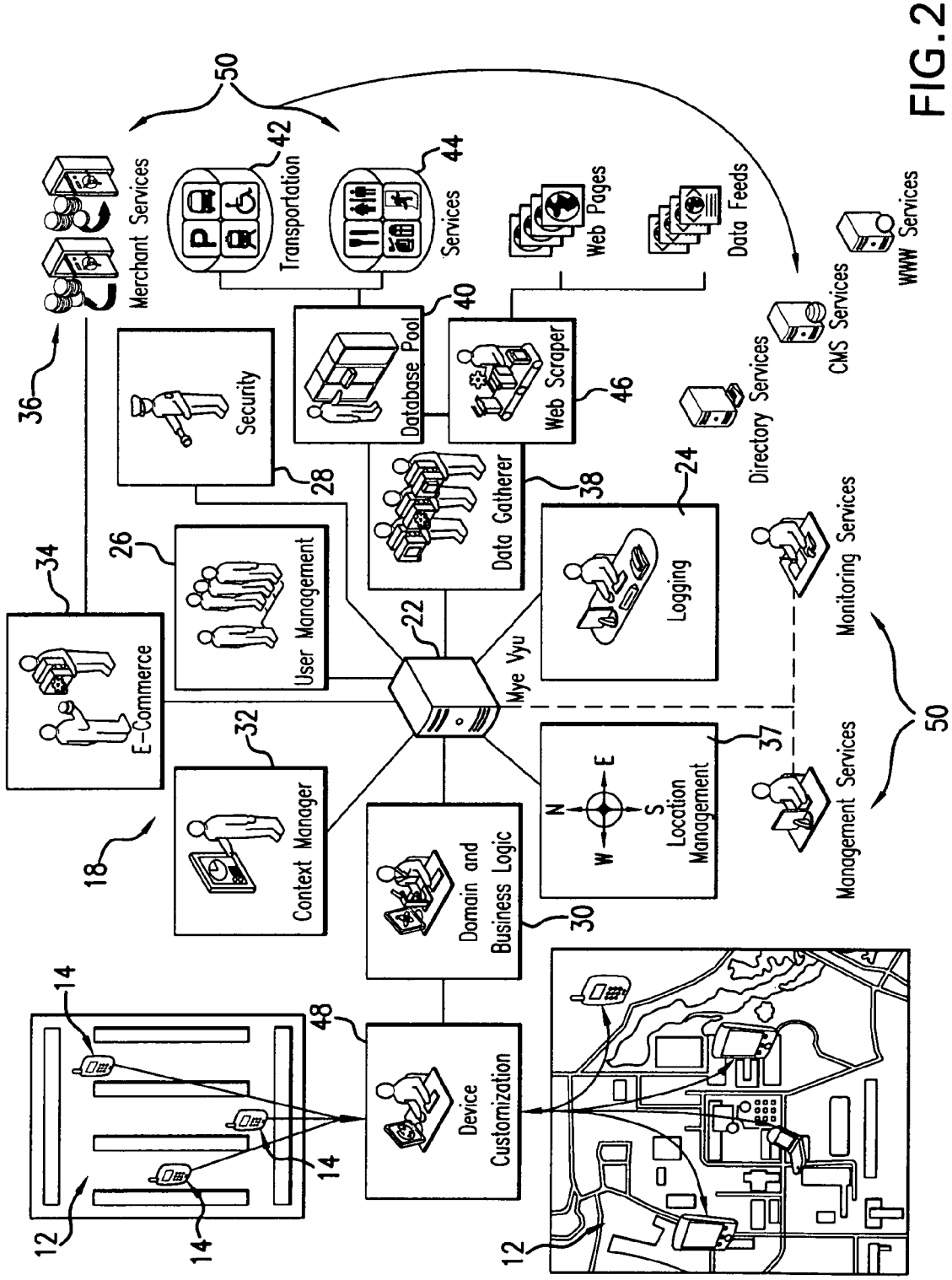
FIG. 2 is a detailed schematic representation of the system of the present invention.

Referring further to FIG. 2, the MyeVyu system 10 further includes a Logging component 24 responsible for logging all information that passes through the server 18.

A User Management component 26 manages the interaction of the MyeVyu system 10 with all users 16. It is also responsible for acquiring, retaining, using, and updating the entire user related context information during an interaction session. Each user 16 interacts with the User Management component 26 after a Security Component 28 completes the authentication of the user, as will be described further herein. The User Management component 26 also contains preferences to be used by the Domain and Business Logic component 30.

The Security Component 28 which provides the security functionality to the system including the authentication of a user, controls access privileges, manages security keys, and encrypts, decrypts and signs information as necessary.

The context information about each user of the MyeVyu system 10 is contained in the Context Manager 32. The Context Manager supplies context information regaining all active users to the User Management component 26 and updates the context information when requested by the User Management component 26. The Context Manager (also referred to herein as a Context Database) 32 is a dynamically changeable entity which is customized by the controller 22 substantially in real-time responsive to the dynamics of an interaction session, as will be described further herein.

A redundant copy 33 of the context database is also available in the client device in a volatile memory block. If during the interaction session, the server fails, the client device starts using the redundant contextual information. The redundant contextual information changes dynamically in accord with the context database in the server.

An E-commerce 34 carries out required transactions for any E-commerce activity supported by the system 10, e.g. supporting the commerce transactions and connects to Merchant Services 36. The Merchant Services 36, which is the external services for the system 10, connects to credit card service providers and carries out the credit card transactions. The Merchant Services also connects to third-party merchants such as for example PayPal, and carries out all merchant specific services for the system 10.

A Location Management component 37 is a dedicated unit responsible for managing the client device location services within the communication domain 12. It provides the location determination services using appropriate technologies such as for example, GPS, PinPoint, Horus, etc., and interacts with other components of the system to acquire the information necessary for determining the location. For example, the Location Management component 37 may acquire the information about the Access Point a client is connected to in the WiFi environment, and may also obtain received signal strength indicator (RSSI) values. The Location Management component 37 may provide the location information in an appropriate coordinate system along with an estimate of the relative accuracy as required. The location information, for example, may be presented in latitude/longitude units or may be presented in terms of surrounding objects such as building, floor, room, etc.

A Data Gatherer component 38 is responsible for querying heterogeneous data sources, receiving responses from such data sources and making them available to the server 18. The Data Gatherer includes a Database Pool 40 which keeps database connections to all accessible databases, issues queries to the databases it is connected to, and receives responses, for example, for querying the transportation database 42, services database 44, etc.

The Data Gatherer component 38 further includes a Web Scraper 46 which contains the knowledge of how to gather information from the World Wide Web (web pages, data feeds), and carries out the data gathering as necessary.

The Domain and Business Logic component 30 is a necessary attribute of the server 18 which may have one or more components 30. The Domain and Business Logic component serves to confirm all operations of the system.

A Device Customization Component 48 is connected to the Domain and Business Logic 30 and serves as an entrance point for the client devices 14 into the system 10. Based on the context for each client found in the Context Manager component 32, the Device Customization unit 48 customizes a display for the client device, as well as the communication channel between the client and the system during the interaction session.

The MyeVyu system 10 further includes a plurality of service providers (services) 50 providing services available to the clients, including for example the merchant services 36.

The User Management component 26 is sufficient for managing the clients 14 in a single communication domain 12. However, when the user moves from one communication domain to another, the MyeVyu system 10 provides a seamless experience for the user 16. The server 18 associated with the communication domain 12 and server 18' associated with the communication domain 12' communicate each with the other through the channel 52.

In the multi-domain system 10, each client device 14 has a home system to which it is registered and which uses the Location Management system associated with the home domain 12. As the client device physically moves to another communication domain 12', the client 14 is required to authenticate itself with the server 18' of the foreign system (12').

Based on administrative policies, the two systems (home and foreign) have service-level agreement which defines the services that each system will provide to clients of the other system. When the controller of one system detects a foreign client device, it checks whether it has an appropriate service-level agreement with the controller of the device's home system. If such an agreement exists, the controller of the foreign system requests transfer of relevant state about the client device from the home controller and subsequently provides necessary services to it. Controllers of different systems use the inter-controller protocols to interact through the channel 52 which may be a wired or wireless high-bandwidth connection channel.

Several communication domains may be connected by connecting their servers together. The clients that wish to utilize services of another communication domain will send all requests from its home server to the remote server which then ensures that the client has the right to access the service that it wishes to. This policy may either be based on whether or not the client itself has the privilege to access this service on its own or whether or not the entire communication domain has access to the service. Additionally, this privilege can be mitigated based on any contextual information any entity of the system 10 provides.

All communications in the system 10 are tagged with location and time. This information is extensively used as a part of the Context database 32. All communications are also logged and security of all communications is supported through the system.

The MyeVyu system 10 provides a network for client/server and server-to-server connection, in which clients may find the appropriate services dynamically, and where contextual information is used at all stages of operation. The entities in the system 10 have the ability to communicate and share information.

The server 18 mitigates communication between one or more clients and one or more services. A client connects to the server, maintains a lively connection, and may utilize services from the services supported by the system. The service provider also connects to the server and maintains a lively connection. The service provider provides a meaningful service to a client, either providing a brand new service or providing already existing services. The roles of the client, server and service providers are functional roles and physical implementation may implement multiple such roles on a single device.

In operation, the client device 14 starts an interaction session with the system 10 by logging onto the server 18. During a session, the client may request a variety of services. The server is responsible for providing the services in the context of the client's current interaction session. It actively collects the contextual information and actively uses it for customizing the interactions in the session. The contextual information the server uses includes, but is not limited to:

Client specific information such as role, function, and device characteristics,

Networking information-protocol used, bandwidth available, session start time,

User specific information such as preferences, personal data, medical history, financial such as credit cards, bank account, etc., Context information also may be concerned with the privacy policy of the system, security policy, calendar of scheduled events, device characteristics, screen size, processing power, transmission characteristics, such as channel bandwidth and through put. The service providers may access the contextual information to improve the service they provide.

A plurality of client units may be connected to the server(s) and their location may be tracked to the accuracy supported by the Location Management technology available for the client at the communication domain. All interaction with the server may retain a time stamp and a location tag. A client may upload a static photo, and audio stream and/or a video stream generated by its client device for storage at the server.

The server 18 maintains a relevant context for each client and has a full logging capability. Any information that flows through the server is logged and special information may be stored at the server in appropriate information banks. For example, the server is able to store audio/video streams uploaded by the clients. These audio/video streams may be cataloged with location, time, and any specific text supplied by the client at the time of uploading the video or at some later time.

The system 10 has an unprecedented utility and a wide variety of user-, commerce-, and security-centric applications.

One of the important qualities of the MyeVyu system 10 is the panic alert mechanism 56 designed to provide a public safety function which will be explained in detail in conjunction with FIGS. 3-6. The panic alert mechanism 56 permits alerting the public safety personnel when a client encounters a situation requiring assistance. The mechanism 56 is designed to be easily invoked and may use a variety of mechanisms for initiation of a panic alert session, such as, for example, button based, (physical button, screen button), Bluetooth based, voice based, etc.

In a situation where a user of the MyeVye system 10 is being approached by an angry and menacing group of individuals and he/she worries for his/her safety, the panic alert mechanism 56 may be activated by the user by actuating a panic alert actuator 58 available on the client device 14 in emergency situations. For example, the panic alert actuator 58 may be in the form of a "panic" button on the screen of the client device 14, shown in FIG. 5.

Figure 3:
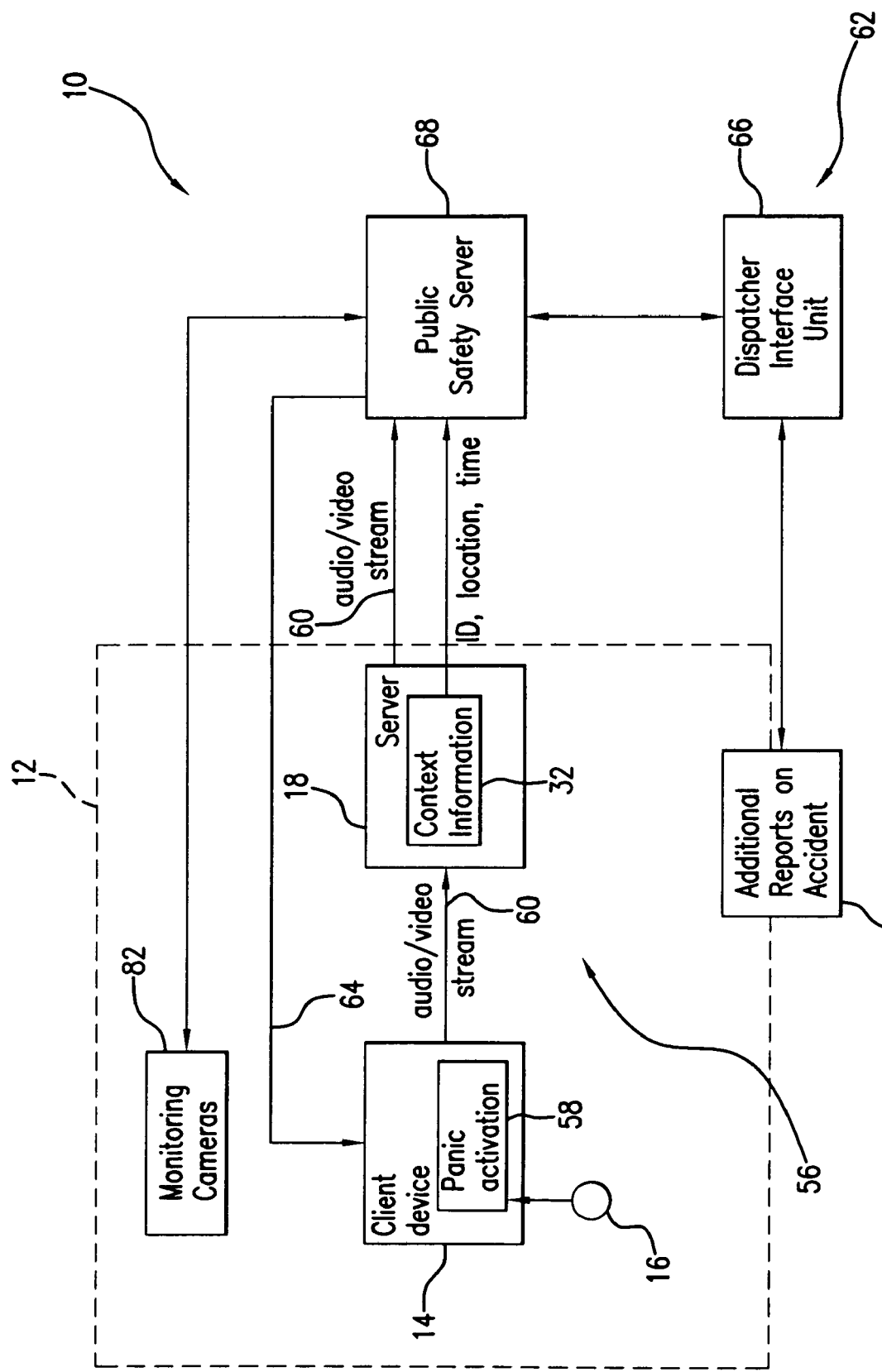
FIG. 3 is a schematic representation of the panic alert mechanism provided by the system of the present invention.

Additionally, the panic alert mechanism 56 may be activated by an audio command, for example, voice command, a specific word, a predefined combination of keys on the keyboard, etc. For the sake of simplicity, but not to limit the scope of the current invention protection, further discussion is concerned, as an example, the "panic" button as one of the implementations of the panic alert actuator. When the user presses the "panic" button, depending on the technology available at the client device, the following sequence of operations is launched:

As shown in FIG. 3, all the data acquired by the user's cell-phone camera and microphone is transmitted in real-time to the server 18. The audio/video stream 60 will be forwarded from the server 18 to the nearest police precinct/public safety department 62 accompanied by the contextual information such as the client ID, location and time of the accident. The logging of all this information will be performed at the server 18, while the police department 62 may provide its own logging as well. A return connection path 64 may be provided for use by the police department, so that a confirmation message issued by the police department 62 may be sent to the client device 14.

Figure 6:
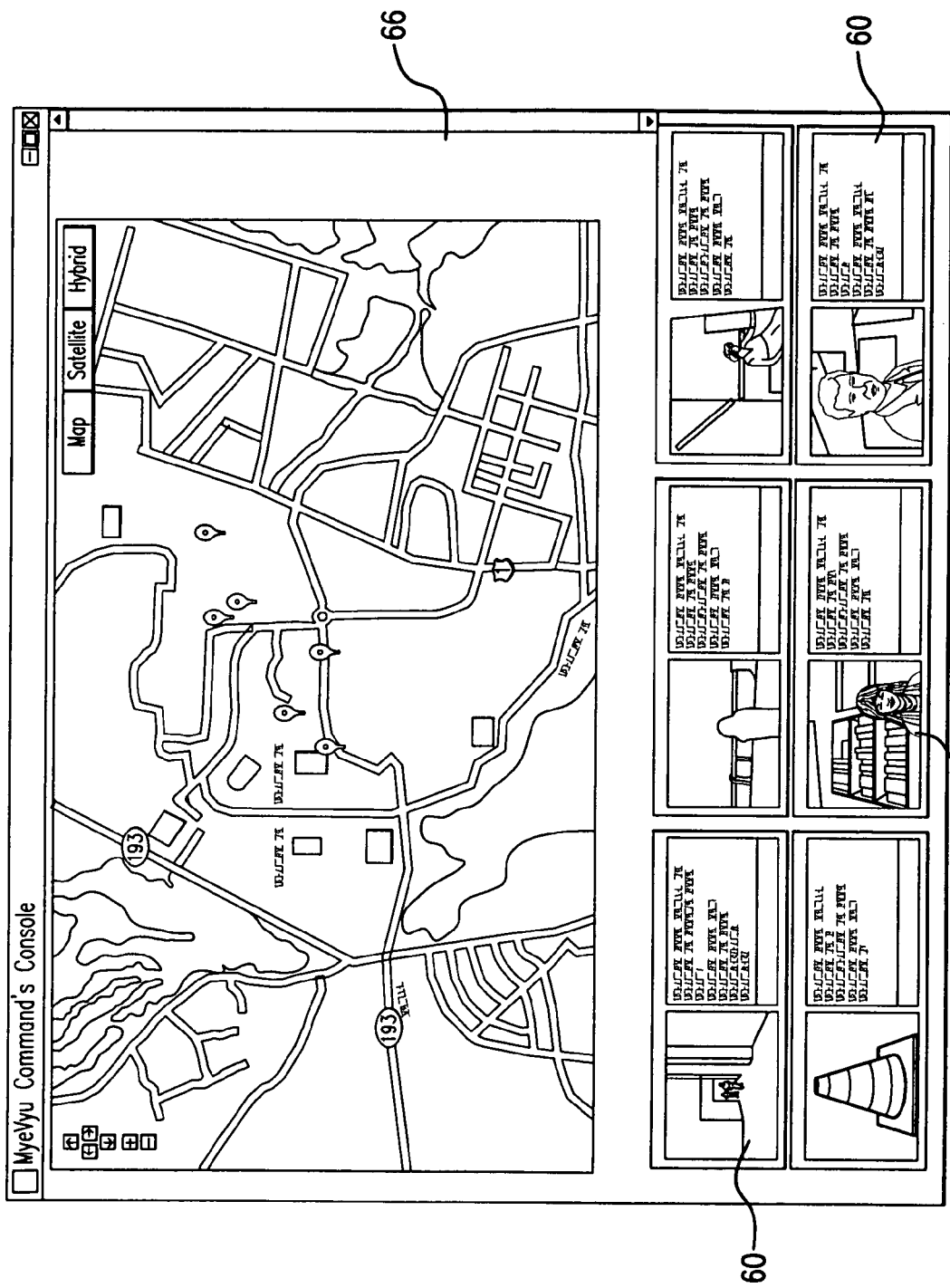
FIG. 6 illustrates the embodiment of the police dispatcher's console.

A police dispatcher is provided with I/O unit, for example a dispatcher console 66 as shown in FIG. 6, on which the dispatcher is not only able to see the miscreants but also is able to hear what they are saying, see the location of the accident in real-time, as well as the identification information of the user and may decide if subsequent developments warrant, dispatching a patrol car to that location. If a criminal incident does take place, regardless of the fate of the client device, the relevant data would have already been recorded at the server.

Figure 4:
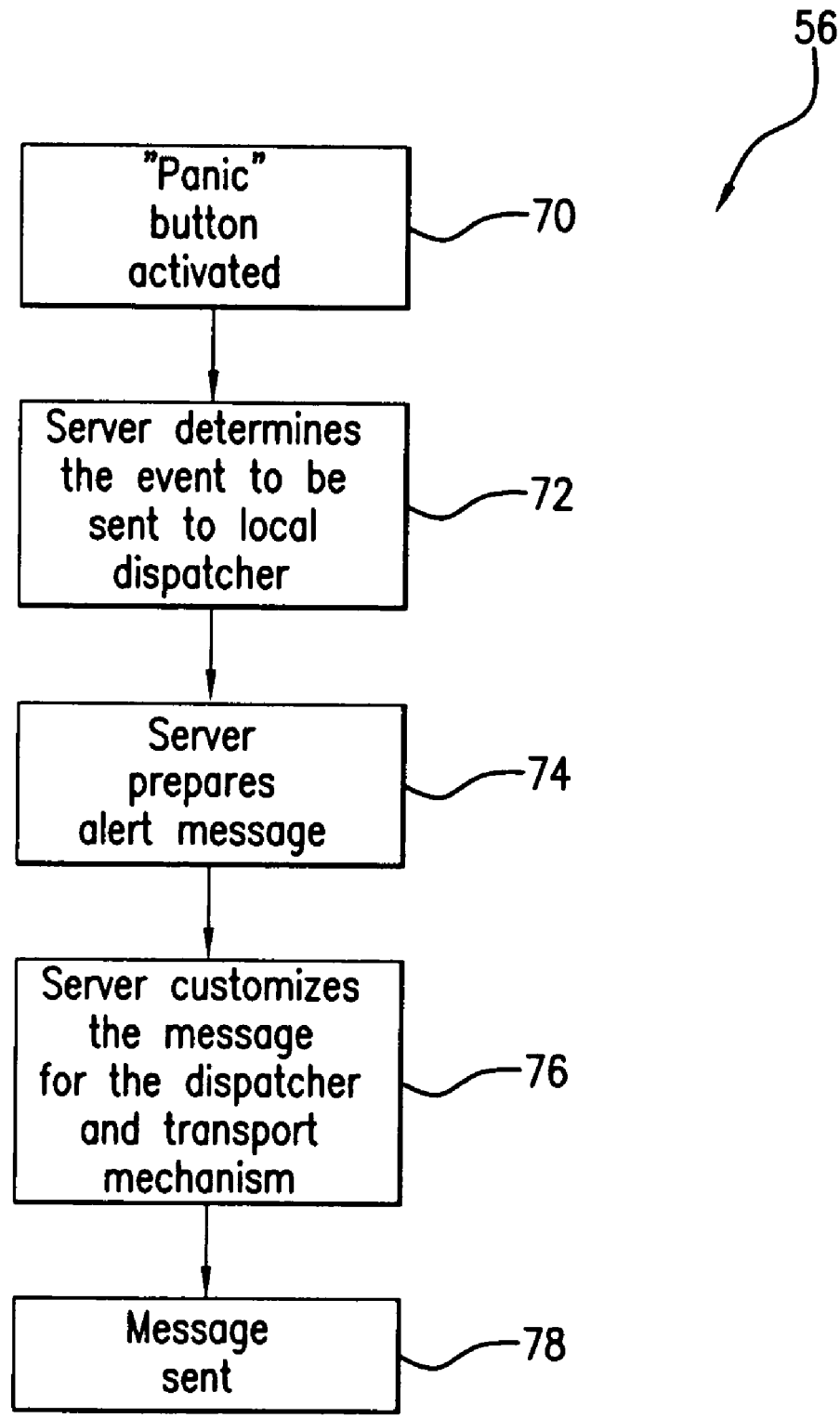
FIG. 4 is a flow-chart diagram of the panic alert process of the present invention.
Figure 5:
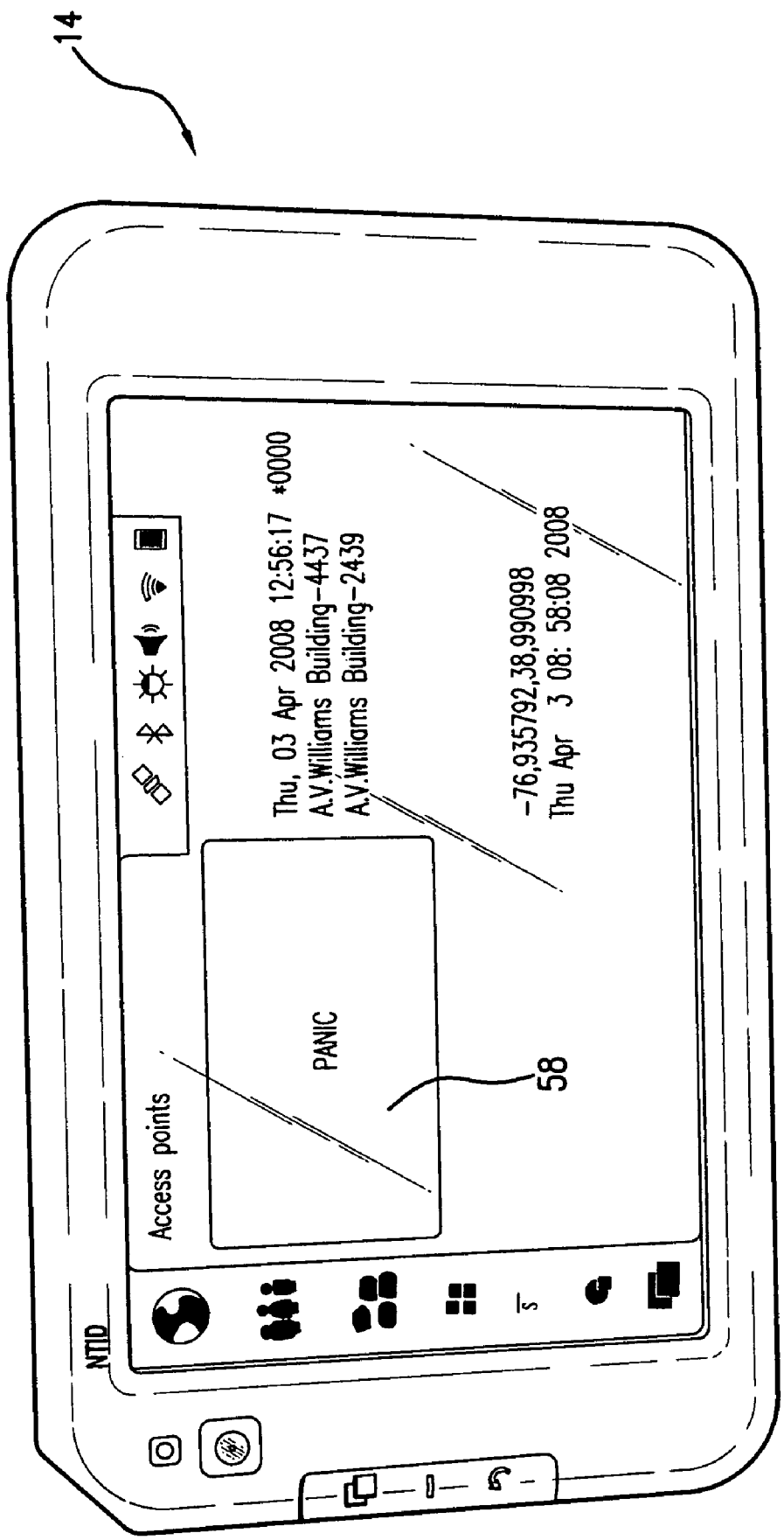
FIG. 5 is an illustration of the client device with a panic button shown thereon.

Referring to FIG. 4, the algorithm underlying the panic alert mechanism 56 is actuated in block 70 "Activate 'Panic' Button". Upon activating of the "Panic" button, the system 10 flows to box 72 where the server 18 determines that any information on an event of interest, (e.g. incident), is to be transferred to the local emergency response unit. At this time, the server 18 has received the audio/video data stream and has stored the data. The logic further passes to block 74 to prepare an "alert" message to be transferred to the public safety server 68. The "alert" message includes a video/audio stream from the client device relaying the information from the incident scene, as well as the contextual information, e.g. user ID, location and time of the incident.

In block 76, the server 18 also customizes the message to be sent to the public safety server for each client and transportation mechanism. When the message is ready to be transferred to the police precinct, the server 18 sends it out in block 78.

The system 10 may have a Public Safety Server 68 which has the capability of communicating with the client using various communications means including SMS, audio and video. The public safety server logs all incoming communications and may decide to forward a data stream to a field unit assigned to respond to the incident.

The public safety server has the further capability of connecting to other public safety servers (e.g. the police dispatcher may connect to the EMT server) and forward a stream as necessary.

Public safety server 68 is additionally designed to handle multiple reports 80 for an incident and give an operator of the console 66 the capability of grouping them as belonging to one incident. The public safety server may access static monitoring cameras 82 in the area of the incident to form an integrated view of the incident scene.

The panic alert mechanism of the present invention may be thought of as an Every-Citizen Neighborhood Watch whose scope extends from alerting law-enforcement to criminal investigation to criminal justice.

The MyeVyu system 10 further provides for a record-an-event function where a client may record an event by sending to the server an audio/video stream which will be stored with a location tag, time stamp and any tag that the client may provide.

The ability of the system 10 to communicate audio/video streams from the client devices to the server also may be used for attaining the following uses of the system:

Imagine a person at a rock concert trying to show his/her friends the view of the pop star. With the MyeVye technology all the user will need to do is to upload his video in real time directly from the cell phone to the server from where his/her friends will be able to access it with the location and time stamp.

Imagine two parties entering into a verbal contract. The MyeVye system may allow real-time uploading of the relevant audio-visual streams with location and time stamp. The technology also comprises an authentication service that may be able to certify the location and time of the recording, similar to a notary certifying the identity of a person.

The above scenarios are meant to be illustrative and certainly are not exhaustive.

In the panic alert scenario, e.g., panic alert, the public safety unit serves as the entity of interest for the user. The information provided by the client device 14 to the server 18 is accessible for the entity of interest, (e.g., the police department), at several levels of accessibility depending on degree of integration of the entity of interest into the system. Outsiders may have a limited access to the information in the MyeVyu system while clients may have full access. Therefore, the emergency response unit, when functioning as an outsider, may only know the location and the type of emergency rather than be able to see the actual video from the scene of the incident which would be fully available for the public safety unit integrated with the system 10 as one of the clients.

The MyeVyu 10 enables a user to customize the spatial and temporal distribution of their streaming media content to different entities of interest predefined by the user, including:

the target audience for distribution, such as, for example, social network, or professional network;

based on the location extent for distribution, such as, for example, static geographic entities (community, city, county, etc.), dynamic geographic extent (within 2 miles of present location), or context-sensitive locations (nearest precinct fire station or police station);

based on the temporal extent for distribution, such as, for example, until a fixed deadline, for "n" minutes, hours, days into the future, etc.

The users may also download data from the server based on their rights and privileges to the data. One of the important aspects of the MyeVyu system is in its ability to allow the users to visually query the data-streams based on their context in space, time, or relationship networks, as presented supra.

Another function supported by the MyeVyu system 10 is a queries function where a client may initiate an interaction session to submit a variety of queries which are supported by the server. Responsive to the queries, the system provides to the user the information which either is already stored within the MyeVyu system, or collected by querying other sources. Suitable protection for such information is supported by the server.

Figure 7:
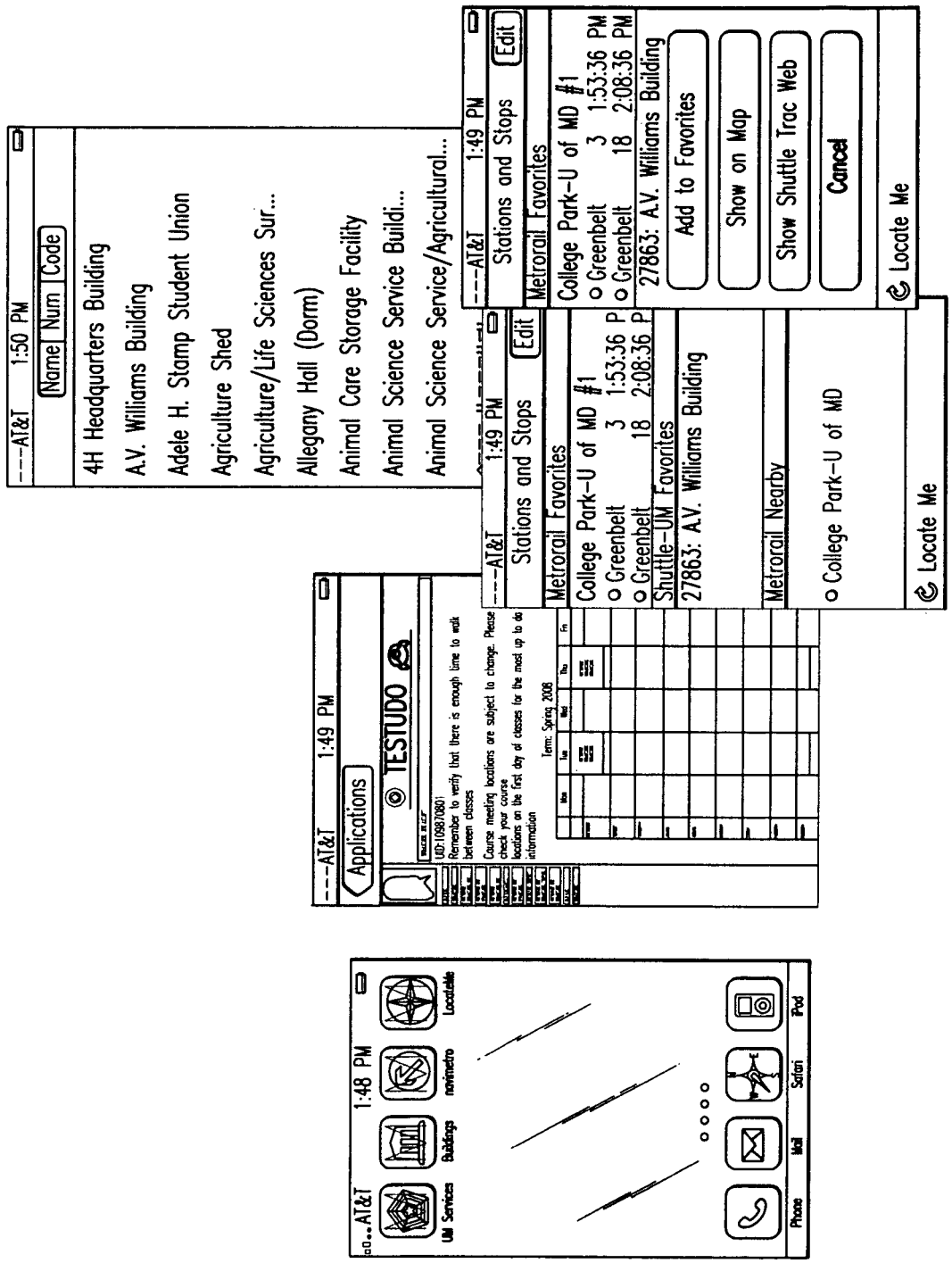
FIG. 7 illustrates one of the embodiments of the client device adapted for implementation of a subset of applications.

As seen in FIG. 7, the client device is provided with icons or indicia on the display thereof (which also may be a voice activated indicia, etc.) actuated by the user for requesting services related to different aspects of the user's life and interest. For example, for a student, the following aspects of the campus life may be supported by the MyeVyu system:

Weather information
  Current weather on campus
Education
  Student/faculty logs on
  Obtains today's schedule of classes and assignments due
  Checks grades from the last exams
  Determines when and where the study group is meeting
  Streams the video from the last missed class
  Requests an appointment with the teacher
Campus information
Building information
  What building is where
  Who has offices in that building
  Where are the labs and departments
  Where are the rest rooms and vending machines
Information about campus events
  Movie theater listing
  Performing arts schedule
  Colloquia in the area of interest (filtered by student profile)
Campus travel
  Parking—where I parked my car and how I can get back to it
  Campus shuttle bus routes and real time information about the schedule
  Best route (in real-time) to come in to the campus and leave the campus
  Best walking route to go from building to building on campus
Social life
  Location of friends
  Establishing an audio/video connection to them
  Group communication mechanisms
  Privacy mechanisms are implemented to restrict the access
Calendar
  Maintain a calendar of all known meetings and their location
  Reminds about upcoming meetings taking into account the current location and travel time to the meeting location
  Supports scheduling of meetings, and many others.

Figure 8:
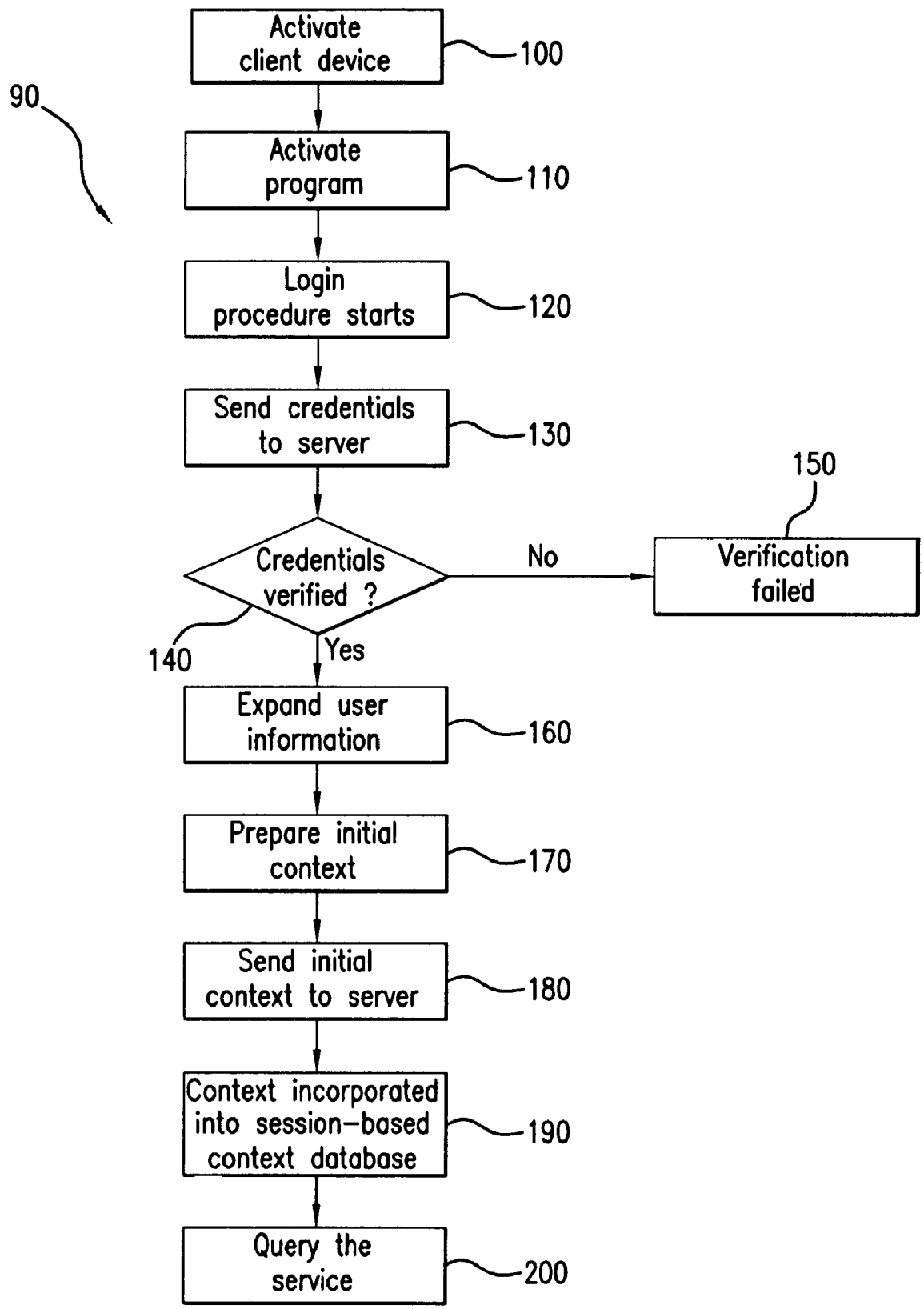
FIG. 8 is a flow chart diagram of the sub-routine designed for connecting the client device to the server.

Referring to FIG. 8, when the client initiates the interaction session, the "Connecting to Server" sub-routine 90 of the software 23 starts in block 100 "Activate client device" in which the client device is activated. When activated, the client device activates the "Connecting to server" program in block 110 and login procedure starts in block 120.

In block 130, the client device 14 sends credentials to the server 18 so that the server may verify the credentials in the logic block 140. If the credentials are verified, the server aborts the procedure in block 150 "Verification Failed". If the verification is successful, the logic flows to block 160 where the server 18 starts gathering context about the user from the databases in the Context manager component 32 shown in FIG. 2, to which the server has the access.

The system further flows to block 170 "Prepare Initial Context" in which the client device prepares a message including information relevant to the context, including the ID of the user, device characteristics, client device location, wireless radio signals tracks, etc. and sends the initial context to the server in block 180.

In block 190, the server 18 incorporates context into a session based context database, examines the communication methods the client is using, and expands all contexts given to it. For instance, if the client device is located in the communication domain which does not use a GPS, but rather wireless radio signals tracks for location, the server examines the location service that utilizes this data. Upon incorporating the context received from the client device into a session-based context database, the server queries the service providers in block 200 for services requested by the client device.

Figure 9:
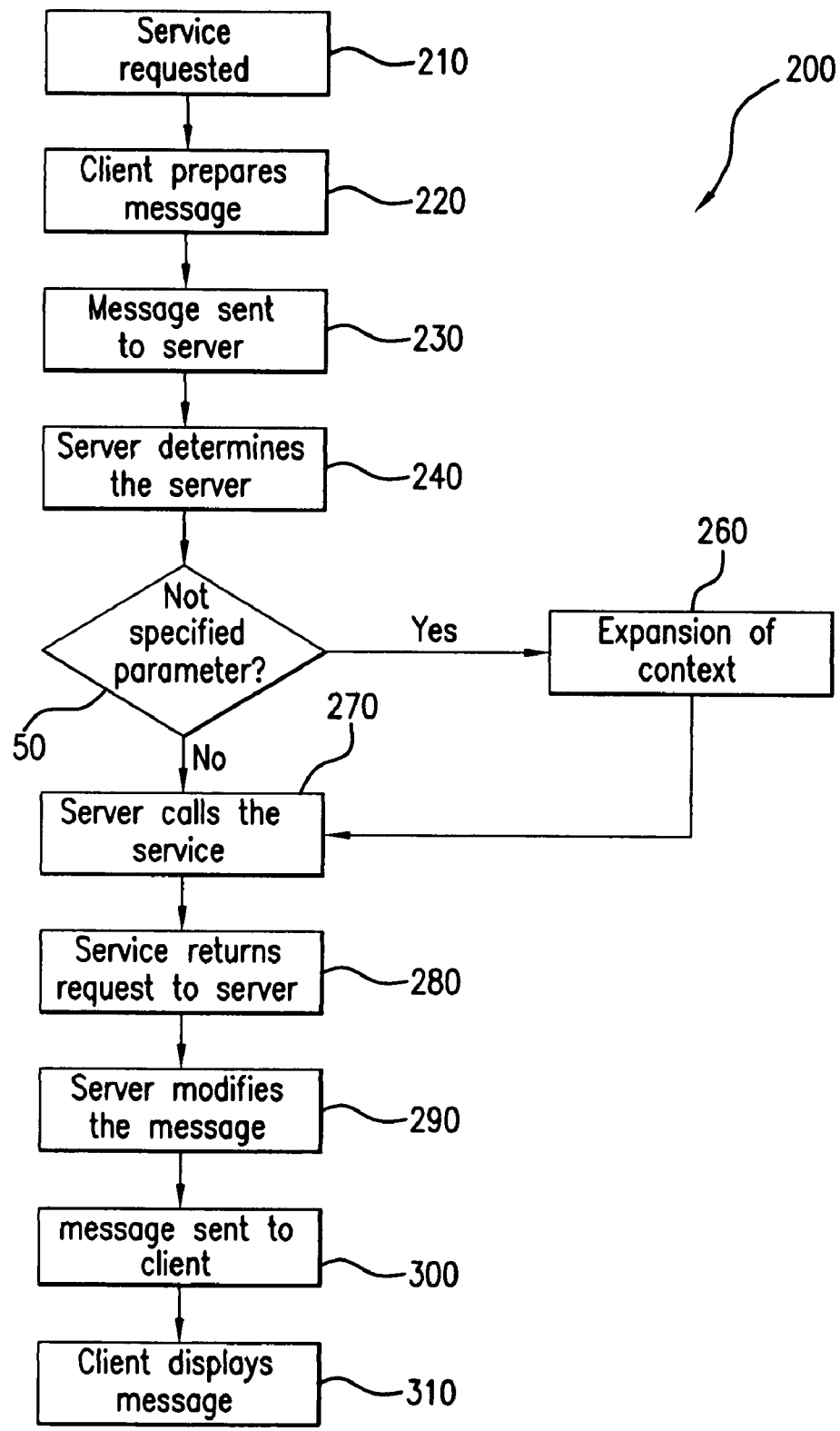
FIG. 9 is a flow chart diagram of the sub-routine designed for querying the services in the system of the present invention.

Referring to FIG. 9, representing the sub-routine 205 of the software 23 for querying the services in the MyeVyu system, when a user 16 wants to issue a service call from a particular screen shown in FIG. 7, such as for example, requesting the information on the weather, the user specifies on the client device the service of interest, for example, by actuating an icon or indicia provided on the client device.

Responsive to the indication by the user of the service requested in block 210, the client device 14 prepares a message to send to the server 18 appended with the nature of the service requested, client's message (information typed in by the user), and contact information (for example, who the client is, where the client is, what time it is, etc.) in block 220.

In block 230, the client device transmits a message to the server. In block 240, the server analyzes the message and determines which service to call. In block 250, the server checks whether the message has a parameter that has not been specified by the client but can be obtained by expanding the context. If there is a non-specified parameter, the logic flows to block 260 and the server expands the context by performing an expansion operation. If in block 250 all parameters are specified, the logic flows to block 270 "Server Calls the Service", in which the server calls the service with all the information given by the client device.

The logic further flows to block 280 in which the service returns with the result to the server.

The logic further flows to block 290 in which the server modifies the message appropriately according to the capabilities of the client device, such as formatting or omission, and communication mechanism. In block 300 the server sends a message to the client and the client device displays the message to the user in block 310.

When the server determines something of interest should be "pushed" to a relevant entity of interest, such as for example to the local police dispatcher when someone actuates the "Panic" button, the server prepares an appropriate message. For each entity of interest the message is intended for, the message is customized for the entity of interest communication and privilege characteristics and the transport mechanism as shown in block 290 of FIG. 9, as well as in block 76 of FIG. 4. Upon the customization is performed in the customization unit 48 shown in FIG. 2, the message is sent from the server to the entity of interest (the device).

Figure 10:
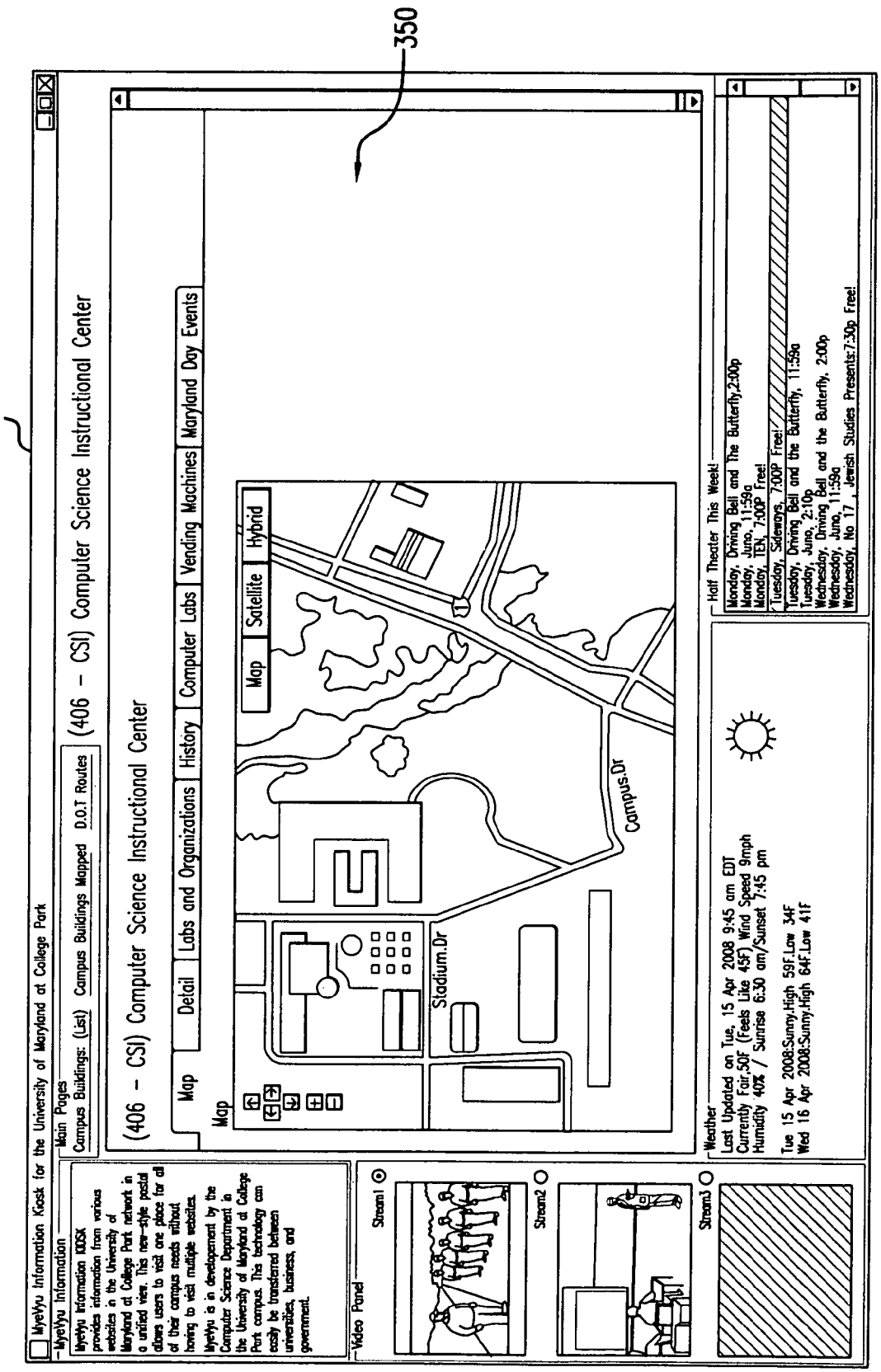
FIG. 10 is a screen of the client device for implementation of the function of the information kiosk.

The MyeNyu system 10 is capable of performing the function of an "information kiosk" for providing information from various web-sites on a single screen shown in FIG. 10.

The "Information Kiosk" 350 is a new-style portal which permits the users to visit a single website for all of their requests without the necessity to visit multiple web-sites.

The MyeVyu system is designed to provide the user with a "seamless" transition from one communication domain 12 to another communication domain 12' independent of what localization technologies are supported by each communication domain.

When there are several location technologies available for the communication domains 12, the system acquires location information from one or more of them, and selects one location technology to use depending on the needs of the session and location. For example, if one location technology provides better accuracy in location determination than another, the server uses the technology having a better outcome. Also, the server considers the load of the location technology on the network and uses the one which has a lesser load on the network than the others. The server chooses a specific location technology out of several available based on different selection criteria, such as for example the above presented. When location technologies in adjacent communication domains differ, the server chooses the one which is available in the current communication domain or the best one which is available in the communication domain. As the client moves from one domain which uses a first location service, to another domain where the first location service is not available, but the second one is available, the server starts using the second location service, so that the client does not see any change in the location determination service.

In the case where there is no available location determination technology in the communication domain which the client entered, the user is then informed by the server that the client's location cannot be determined. The server starts sending the context information for currently picked determination technique in the current communication domain. If the client no longer receives location information, the client responds by stopping the sending of local information or sending only minimal context information for the "previous" determination technique.

The client starts "new" local location determination if available, and sends all relevant contact information to the server to elect. Based on the information, the server chooses the best technique, either server based or GPS-based, for the client and informs the client for the client to follow the decision.

In the MyeNyu system 10, the context database 32 is maintained as a dynamic entity in which the contextual information is acquired/managed and is upgraded in real time. The system has the ability to abstract context from multiple users and groups for the User Management component 26, shown in FIG. 2. The context for the client or a situation contains all relevant information. As the situation changes, the context changes as well and the system keeps track of all the changes in real time. Some of the changes in the context are immediately known to the system. For example, since the location of the client is a part of the context of the client, as the client device moves, its location changes, and with the location being a part of the context, the context changes as well.

In the situation, where the client device is in a shopping center or mall, the initial location context pertains to an entire shopping center and the information made available to the client may be regarding different stores in the mall. But when the client enters a department store, the contextual information changes and may be focused on different departments in the department store. Once the user goes into a men's clothing area, the information may be in terms of one type of clothing versus another.

Another example of dynamic use of context database may be when a user drives a car. While the user is on city streets, the information about parking may be provided by the system on the client's display. But when the user is on a highway, the relevant information may focus on the next rest area.

The server maintains an overall context at all times and continues to modify it as additional clients join or some leave. Also, a context for each client and its current session is kept by the system. An example of accumulating the contact information for the administrator may simply be based on making the log of all activities available. Also, some data analysis on the load information may be carried out to prevent an obstructed information to the administrator.

Although this invention has been described in connection with specific forms and embodiments thereof, it will be appreciated that various modifications other than those discussed above may be resorted to without departing from the spirit or scope of the invention. For example, functionally equivalent elements may be substituted for those specifically shown and described, and in the process method steps described, particular steps may be reversed or interposed, all without departing from the spirit or scope of the invention as defined in the appended Claims.

What is being claimed is:

1. A system for spatio-temporal-context aware interaction of users with an entity of interest, the system comprising:
at least one communication domain covering an area of interest,
at least one server operatively coupled with said at least one communication domain,
a plurality of client devices, each client device interacting with said at least one server in at least one interaction session to transmit a data stream thereto, wherein each client device is associated with a respective user,
at least one entity of interest defined by said respective user for selecting from a collection of available services,
a context entity including contextual information and operatively connected to said at least one server and customized substantially in real time in accordance with dynamics of said at least one interaction session of said each client device with said at least one server,
wherein said at least one server operates for spatio-temporal-context localization of said each client device, collects and in real time dynamically adjusts said contextual information, customizes said at least one interaction session based on said contextual information, and in real-time dynamically reconfigures boundaries of said area of interest as required by dynamics of said at least one interaction session based on said contextual information, and communicates said data stream from said each client device to an authorized entity of interest in a controlled manner; the availability of said entity of interest for selection being adaptively varied responsive to said contextual information.

2. The system of claim 1, wherein said each client device further includes a panic alert mechanism,
wherein said client device transmits a data stream selected from the group consisting of: video stream, audio stream, SMS, static photographs, and combinations thereof,
wherein said authorized entity of interest includes an entity adapted to respond to emergency situations, and
wherein, upon actuation of said panic alert mechanism by said respective user, said data stream along with said contextual information from said context entity is transmitted to said entity adapted to respond to emergency situations for further actions thereof.

3. The system of claim 1, wherein said contextual information transmitted to said entity of interest includes said each client device identification, location tag, and time stamp.

4. The system of claim 1, wherein said context entity includes contextual information concerning said respective user, said each client device, communication channels characteristics, location of said each client device, temporal characteristics of said at least one interaction session, goals of said interaction session, privacy policy, security policy, networking information, data concerning events and services of interest, and said at least one communication domain specific information.

5. The system of claim 1, wherein said at least one entity of interest includes an entity from a group consisting of: target audience for distribution of the information, target location extent for distribution of the information, target temporal extent for distribution of the information, at least one client device, at least one user, an entity of interest outside said system, at least one server associated with another communication domain covering another area of interest, at least one service provider, at least one information bank, and at least one website.

6. The system of claim 1, further comprising a plurality of service providers operatively coupled to said at least one server to provide at least one service requested by said each client device.

7. The system of claim 1, wherein said entity of interest is granted an access to said data stream based on privileges and rights of said entity of interest.

8. The system of claim 1, further comprising at least another communication domain and at least one another server associated therewith, said at least one server communicating with said at least one another server through a communication channel to provide seamless transition for location determination and to access services supported by each of said at least one and at least another communication domains.

9. The system of claim 8, wherein each of said at least one and another communication domains include first and second location management units, respectively, and wherein said at least one server and said at least another sever select one of said first and second location management units to use when said each client device moves between said communication domains to provide seamless location determination.

10. The system of claim 1, further comprising an authentication unit operatively coupled to said at least one server and functioning to certify the location of said each client device and time of said interaction session.

11. The system of claim 1, wherein said at least one communication domain is a substantially contiguous communication domain including communication technologies selected from a group consisting of: WiMAX, WiFi, Bluetooth, GPS, cellular, Ethernet, Internet, PinPoint, Horus.

12. The system of claim 1, wherein said each client device is selected from a group consisting of: cellular phones, PDAs, tablets, Laptops, desktops, devices equipped with interface selected from a group consisting of: display, microphone, webcamera, speakers, earphones, pointing devices.

13. The system of claim 1, further comprising a location management unit operatively coupled to said at least one server and operating to determine the in-real-time location of said each client device.

14. The system of claim 1, further comprising a device customization unit operatively coupled to said at least one server and operating to dynamically optimize communication between said each client device and said entity of interest based on the contextual information contained in said context entity.

15. The system of claim 1, wherein during said interaction session said each client device includes a volatile memory block containing a redundant copy of said context entity available in said at least one server.

16. A system for spatio-temporal-context aware interaction of users with an entity of interest, the system comprising:
    at least one communication domain covering an area of interest,
    at least one server operatively coupled with said at least one communication domain, said at least one server having an information bank allowed therein,
    at least one client device associated with a user, said at least one client device including an alert mechanism for being actuated by said user in a predetermined situation to initiate an interaction session,
    a context entity operatively coupled to said at least one server, said context entity maintaining in real-time dynamically changing contextual information concerning said at least one client device identification, location thereof, and temporal characteristics of said interaction session, wherein said at least one server dynamically reconfigures boundaries of said area of interest as required by dynamics of said interaction session, and
    at least one entity of interest communicating with said at least one server in a controlled manner,
    wherein, upon activation of said alert mechanism, said at least one client device transmitting an audio/video data stream to said at least one server for being recorded in said information bank thereof, and
    wherein said at least one server forwards said audio/video data streams along with said contextual information to said at least one entity of interest defined by said user for selecting from a collection of available services, the availability of said entity of interest for selection being adaptively varied responsive to said contextual information.

17. The system of claim 16, wherein said at least one entity of interest includes an emergency response unit, said emergency response unit responding with predetermined actions to the receipt of said audio/video data stream and said contextual information.

18. A method for spatio-temporal-context aware interaction of users with an entity of interest, the method comprising the steps of:
    forming at least one communication domain covering an area of interest,
    coupling at least one server to said at least one communication domain,
    independently connecting a plurality of client devices to said at least one server, each client device being associated with a respective user,
    connecting a context entity to said at least one server, said context entity maintaining for each user contextual information available for said respective user, client device, said interaction session, communication channels characteristics, location of said each client device, temporal characteristics of said at least one interaction session, goals of said interaction session, privacy policy, security policy, networking information, data concerning events and services of interest, and said at least one communication domain specific information, initiating an interaction session between at least one client device and an entity of interest defined by said user for receiving services therefrom, and customizing said context entity during said interaction session substantially in real time in accordance with the dynamics of said interaction session, dynamically in real-time reconfiguring boundaries of said area of interest as required by dynamics of said interaction session, the availability of said entity of interest for selection being adaptively varied responsive to said contextual information;

said client device receiving said services from said entity of interest based on the content of said context entity.

19. The method of claim 18, further comprising the steps of:

initiating said interaction session by activating a panic alert mechanism provided on said client device, forwarding an audio/video data stream from said client device to said at least one server, and forwarding said audio/video data stream along with said contextual information of said context entity from said at least one server to said entity of interest, wherein said entity of interest includes a public safety unit.

* * * * *